April 4, 1939.  W. P. HUNSDORF  2,153,252

VARIABLE SPEED ELECTRICAL APPARATUS AND CONTROL THEREFOR

Filed Aug. 19, 1936  4 Sheets-Sheet 1

INVENTOR.
WILLIAM P. HUNSDORF
BY Saywell & Wessler,
ATTORNEYS

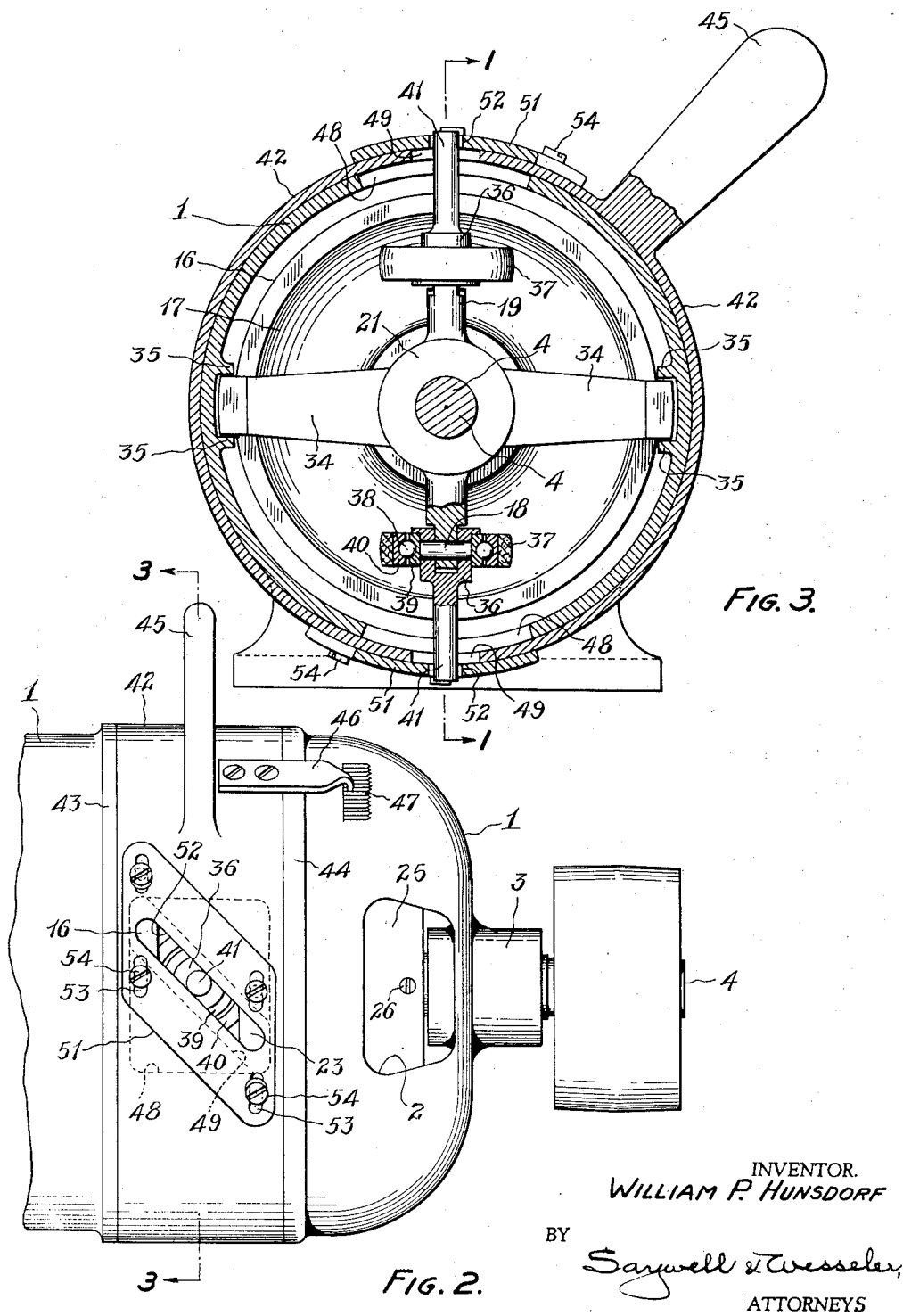

April 4, 1939.   W. P. HUNSDORF   2,153,252
VARIABLE SPEED ELECTRICAL APPARATUS AND CONTROL THEREFOR
Filed Aug. 19, 1936   4 Sheets-Sheet 4
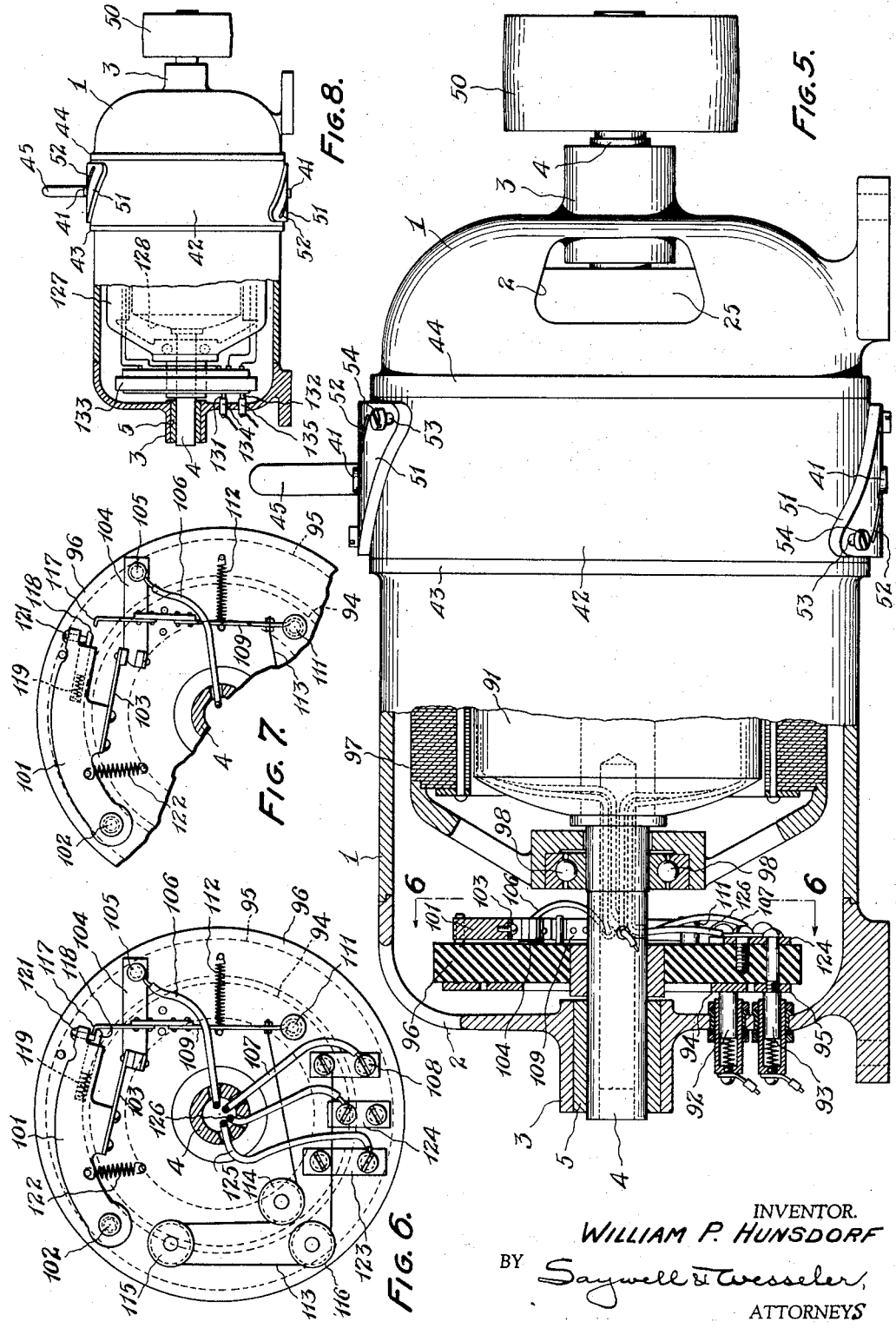
INVENTOR.
WILLIAM P. HUNSDORF
BY Saywell & Wesseler
ATTORNEYS Patented Apr. 4, 1939

2,153,252

UNITED STATES PATENT OFFICE 2,153,252

VARIABLE SPEED ELECTRICAL APPARATUS AND CONTROL THEREFOR

William P. Hunsdorf, Cleveland, Ohio

Application August 19, 1936, Serial No. 96,857

11 Claims. (Cl. 172—239)

This invention, as indicated, relates to a variable speed electrical apparatus and control therefor. More particularly, it is adapted to provide variable speed between the armature and the field members of an electrical apparatus for use in connection with outside apparatus and is of especial value in an alternating current motor to vary the speed of driving other apparatus without reduction in the brake horse power. The principles of the invention are applicable among other uses to direct current motors, but in motors of such type, other variable speed devices are readily applicable and the present invention merely supplies an alternative apparatus of this type. In connection with various types of alternating current motors, however, including induction motors of single phase, split phase, and multiple phase, no satisfactory control is available, those in use being of complicated character and involving large power losses as well as expensive maintenance. The present invention, while particularly adapted to motors of relatively small size, may be made in units intended for heavy duty.

The principal object of the present invention is to provide an electrical apparatus having a rotating field member and a rotating armature member, and means interposed between said members for varying their proportionate actual speeds.

Another object of the invention is to provide a method of supplying power at various selective or graduated amounts from a constant speed motor.

Another object of the invention is to provide an electrical apparatus having a rotating field member and a rotating armature member, and means interposed between and driven by said members from each side in opposite directions for establishing their proportionate actual speeds.

Another object of the invention is to provide an alternating current motor having a variable speed transmission interposed between its armature and field members with means for controlling the same.

Another object of the invention is to provide an apparatus peculiarly adapted for use with induction motors of the single phase, split phase, and multi-phase type to deliver power at any one of a series of preselected speeds.

Another object of the invention is to provide a split phase induction motor with a delayed action centrifugally operated switch.

Another object of the invention is to provide a split phase motor with a delayed centrifugally acting switch having a thermo-controlled latch for determining the time of operation of said centrifugal means.

A further object of the invention is to provide an electrical motor having a rotating field member and a rotating armature member coupled with a speed varying unit and electrical means for holding said revolving units in firm engagement with said speed changing unit.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain structures embodying the invention, such disclosed means constituting, however, but several of various forms in which the principle of the invention may be used.

In said annexed drawings:

Figure 2 is a fragmentary top plan view of the structure shown in Figure 1;

Figure 3 is a transverse sectional view taken along the line 3—3 shown in Figures 1 and 2;

Figure 1:
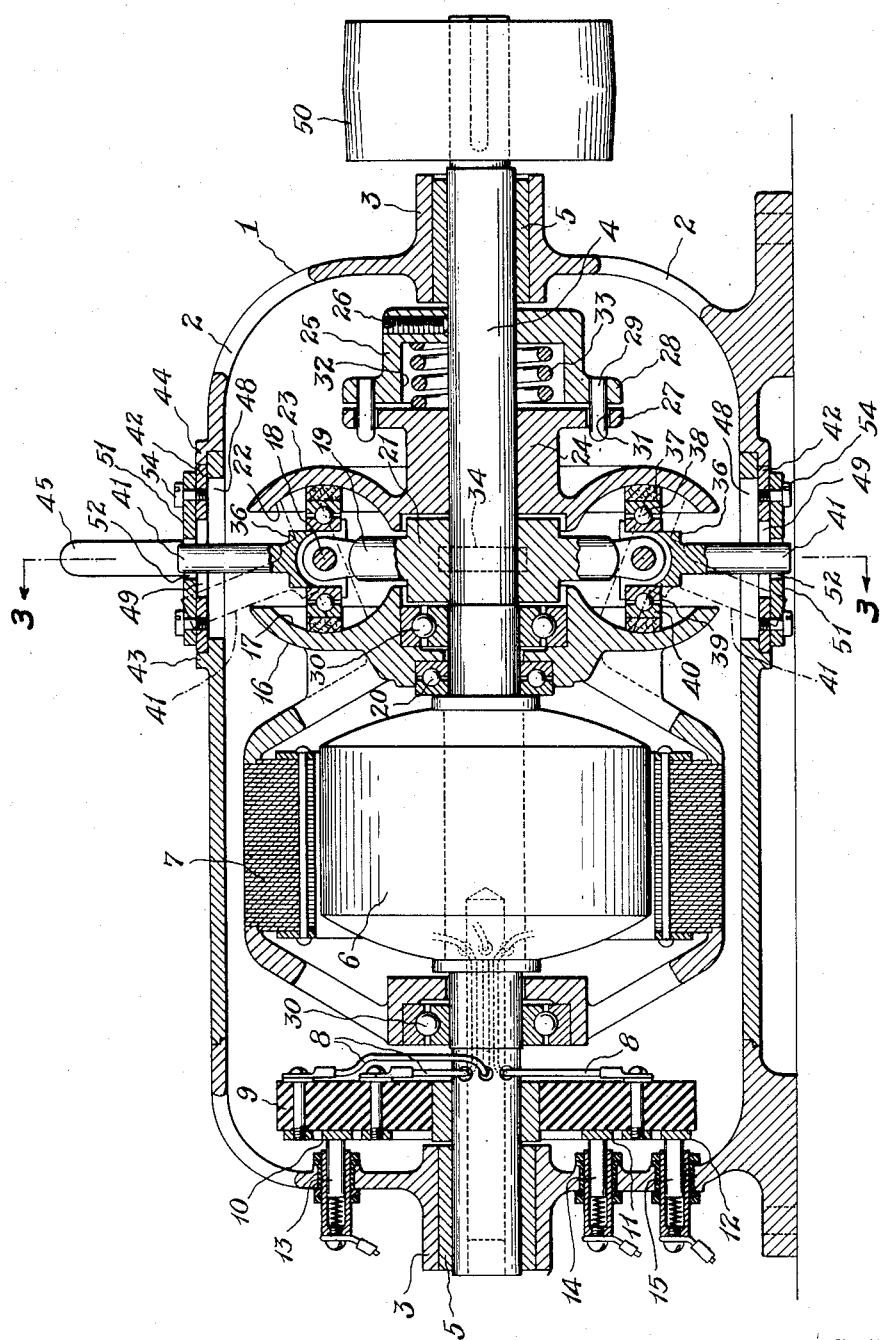
Figure 1 is a central vertical sectional view, taken along the line 1—1 shown in Figure 3, showing a three phase alternating current motor and control therefor embodying the principles of the invention.
Figure 4:
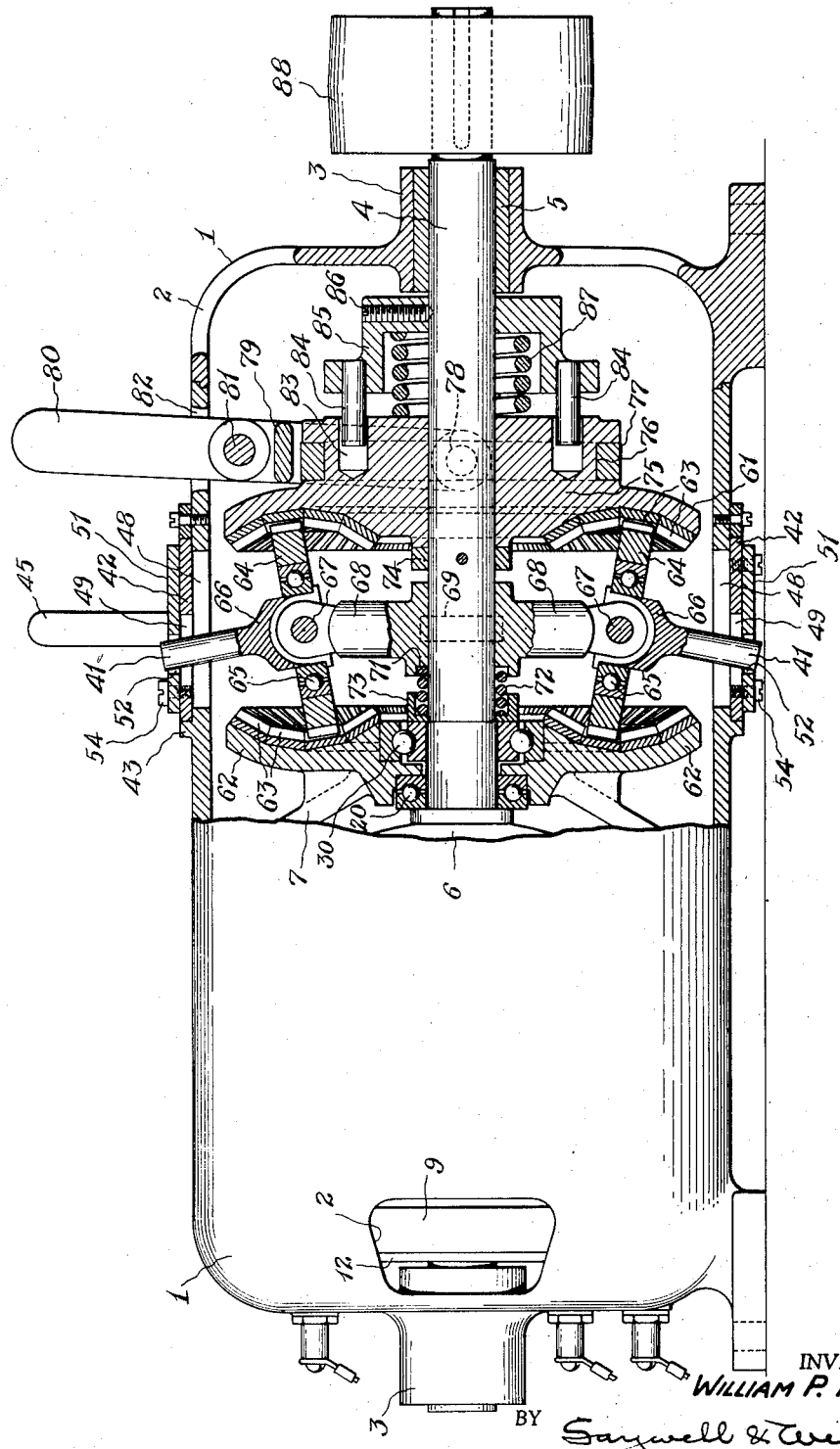
Figure 4 is a side elevation of an apparatus similar to Figure 1, with a portion shown in central vertical section to illustrate a modified type of variable speed mechanism.

Figure 5 is a side elevation of a split phase motor having variable speed mechanism similar to that shown in Figure 1 or Figure 4, with a portion shown in central vertical section to illustrate the split phase winding and control therefor Figure 6 is an end elevation of the split phase motor control mechanism as it appears before the starting of the motor, taken along the line 6—6 shown in Figure 5, looking in the direction of the arrows;

Figure 7 is a fragmentary view similar to a portion of Figure 6 showing the split phase motor control mechanism as it appears after the starting of the motor; and Figure 8 is a view similar to Figure 5, showing a split phase motor with the windings positioned on the outer rotating member, instead of on the inner rotating member as shown in Figure 5.

In the motor illustrated in Figures 1 to 3 inclusive, a casing 1 is provided, the casing being a substantial stationary member preferably with an integral base and providing supporting and enclosing means for the rotating parts. It is provided with ventilating openings 2, and has bearings 3 at opposite ends to receive the shaft 4, which is continuous throughout the motor and runs in suitable bearing sleeves 5. The shaft supports both a rotating energizing element or field 6 and a rotating driven member or armature 7, the field 6, as shown, being non-rotatably engaged on the shaft, and having a plurality of leads 8 secured to a collector ring support 9 having the collector rings 10, 11, 12 on the outer face thereof adapted to be engaged by brushes 13, 14, 15, of conventional type. The armature and field are preferably not in conventional endwise alinement as a slight freedom for endwise movement of one of said members assists in firmly engaging the variable speed mechanism, as will be hereinafter explained.

In the present construction, as has been indicated, both the armature and field members rotate, and it will be understood that these concentrically mounted parts are interchangeable in position, the wound energizing member in the instance shown being mounted on the shaft, and the rotating driven member being positioned outside thereof, whereas, if desired, the rotating driven member could be secured to the shaft, and the rotating energizing member be mounted outside thereof. In order to avoid confusion which might arise from having two members which could be called rotors, in the present case, the driven outer bar wound element will be called the rotating armature member and the rotating member carrying the energizing field coils will be called the rotating field member.

The apparatus may be built for various ratios of field and armature speed. At the conventional alternating current motor speed, the armature and field of the induction motor, shown in Figures 1 to 3, will rotate in reverse directions at identical speed, so long as the variable speed mechanism hereinafter to be described is set at an equal ratio on each transmitting plate. By shifting this mechanism, this total speed of the whole motor may be fractionally distributed in complementary amounts between the rotating field and rotating armature through a wide range of adjustment. This permits coupling one of the rotating members to outside mechanism to drive the same under various requirements of such outside driven mechanism.

The variable speed mechanism, as is clearly shown in Figure 1 of the drawings, is interposed on the shaft 4 between the rotating field member and the rotating armature member, and is driven by each of them, thus having what may be designated a "rolling" action between two energized elements. The shaft 4 may carry a pulley 50 at one end. The frame of the rotating armature 7 is supported on the shaft 4 on ball bearings 30 and has a thrust bearing 20, and is provided with an end plate 16 formed with an annular channel or trackway 17 with an inner surface formed on a radius of relatively short extent and centering in a pivot element 18 provided on a spider 19 having a hub 21 freely supported upon the shaft 4. Corresponding with the annular channel or trackway 17 is a recess 22 formed in a transmitting plate 23 upon a hub 24 freely supported upon the shaft 4 and adapted to drive said shaft through a collar 25 secured to the shaft by means of a set screw 26.

The connection between the hub 24 and the collar 25 is preferably by means of a pair of flanges 27, 28, on said parts, respectively, the flanges 28 having drive pins 29, and the flanges 27 having enlarged recesses 31 through which the drive pins project, such recesses permitting a slight amount of lost motion so as to permit free alignment of the parts. This connection permits a slight degree of endwise movement of the central field member, which, as heretofore described, is preferably slightly offset from central magnetic balance in a direction toward the variable speed unit. As it is electrically drawn to a balanced position, it applies a degree of pressure on the variable speed elements through the plate 23. The collar preferably is formed with an internal countersunk recess 32 which provides a housing for a spring 33, which at its forward end bears against the end of the hub 24 and thus forces the annular recessed members toward each other with a degree of resilient pressure sufficient to operate the drive, which for small installations will preferably be a friction transmission, or drive, such as is shown in Figures 1, 2 and 3, but which in some cases may more satisfactorily embody other types of drives, such as fluid transmission, having vanes or other elements, or may incorporate positive gear driven elements, such as are shown in Figure 4.

The friction transmission shown in Figures 1 to 3, may include one or more drive elements in accordance with the size of the apparatus and the horsepower which it is intended to deliver. The spider, if provided with three arms, will form a self-adjusting floating transmission element and for many uses will be found to be adapted for long service without attention.

The spider shown in Figures 1 and 3 has four arms, two of said arms being positioning arms 34 having their free ends engaging somewhat freely in longitudinal guideways formed by spaced ribs 35, on the inner surfaces of the casing, and the two arms at right angles thereto being the spider arms carrying the transmission elements. Whatever the number of driving elements selected, the driving mechanism mounted on each arm of the spider 19 will be substantially identical and will comprise the structural elements clearly shown in the drawings, wherein the ring support 36 is engaged over the pivot pin 18 mounted in the end of the spider arm in a central plane intermediate the plates 16 and 23, and carries the annular friction drive ring 37. The drive ring is preferably provided with ball bearings 38, engaged between the inner and outer ball races 39, 40. The ring support 34 preferably has a control pin 41 extending radially from the outer surface thereof. The control pin is adapted to move the ring support to various positions of adjustment about the pivot pin 18, bringing the annular drive ring 37 into different positions of contact with the concave annular channels or trackways 17, 22, of the plates 16, 23. With the peripheral contact of the drive ring near the outside of one plate member, the peripheral contact with the companion plate member will be near the inner part of the track, and the last mentioned plate will move more slowly than the other due to the transmission ratio thus established.

The means for moving the control pins 41 comprises a sliding control band 42 engaged about the casing intermediate a pair of guide ribs 43, 44. The band is provided with a control handle 45 and is also provided with a spring arm 46 adapted to ride into notches 47 on the casing to designate certain positions of adjustment whereby certain predetermined transmission ratios are established. At the positions of the respective control pins 41 the casing is provided with openings 48 and the sliding control band is provided with registering openings 49, preferably of diagonal shape and of somewhat lesser extent. Over these openings in the control band guide slot plates 51 are adjustably mounted. The guide slot plates as shown are somewhat diamond shaped and are diagonally positioned on the control band, having elongated slots 52 of slightly less extent than the diagonal slots in the control band. The guide slot plates are formed with elongated marginal openings 53 through which locking screws 54, secured in the control band, are engaged. Thus an individually adjustable guide slot is provided for each pin and uniform action of the various parts can be brought about.

Thus, with the mechanism above described, a variation of speed between the rotating field and the rotating armature may be brought about through a large number of ratios, the size of mechanism illustrated being appropriate to secure a speed variation of five to one. The particular apparatus above described relates to the multi-phase alternating current motor, although the change speed mechanism is applicable to other types of motors heretofore mentioned.

The motor illustrated in Figures 1, 2 and 3, is provided with a friction drive and for smaller units such drive is adequate. However, in larger installations, a more positive drive may be found desirable, and in such cases a transmission mechanism employing toothed gearing may be employed. A transmission of the toothed gear type is illustrated in Figure 4, the balance of the motor structure conforming to that of the three phase motor shown in Figure 1. If desired, the motor may be of a different type, for example, like the split phase motor shown in Figures 5 and 8.

In the gear type of variable speed mechanism shown in Figure 4, many of the parts correspond in shape and function to those illustrated in Figures 1 to 3, but the adjustment is somewhat different. The slidable and non-slidable transmission plates 61, 62 are each provided with a series of gears in the form of annular members 63 positioned in concentric relation and conforming approximately to the arc described by the periphery of one of the ring drive gear members 64. Each of the ring drive members is carried on a ball bearing 65 mounted on the ring support 66 which is pivoted on the pin 67 mounted at the end of an arm of the spider 68, which has positioning arms 69 similar to the positioning arms 34 shown in Figures 1 and 3, and supported in the casing in like manner.

The control pins 41 and control band 42 are similar to those shown and described in connection with Figures 1 to 3, and have been designated by the same reference characters.

The hub of the spider is recessed adjacent the fixed transmission plate 62 to provide a seat 71 for a coil spring 72 engaged over the shaft 4, the opposite end of the spring being received in a flanged collar 73 bearing against the hub of the non-slidable plate 62. The coil spring 72 is a light spring member adapted to move the spider and its associated gear drive members out of engagement with the gears of the non-slidable plate, after the slidable plate and its associated parts have been moved to disengaging position. A stop collar 74 is secured to the shaft in spaced relation to the end face of the spider opposite the spring to limit the outward movement of the spider. The thrust bearing 20 prevents inward movement of the non-slidable plate 62 and its associated parts.

The sliding plate 61 is provided with a hub extension 75 with a circumferential groove 76 to receive shifting collar 77 carrying bosses 78 adapted to be engaged by a shifting yoke 79 having a handle 80 pivoted on a bar 81 mounted on the casing beneath an opening 82 through which the handle projects. The hub extension is provided on its end face with recesses 83 into which driving pin members 84 carried on the flange of the driving collar 85 slidingly engage. The driving collar is secured to the shaft 4 by means of a set screw 86. The collar 85 is recessed to provide a housing for the coil spring 87 which is heavier than the coil spring 72 and normally holds the speed changing elements in driving position. A pulley 88 for a power take-off may be provided on the end of the shaft 4.

In place of merely shifting the control band as in the construction shown in Figure 1, the gear type of variable speed mechanism requires the separation of the gear teeth on the transmission plates from engagement with the gear teeth on the annular ring gear members. The yoke member when moved by the handle 80 will effect this disengagement and while the gears are still held retracted the control band is shifted by means of its handle 45 to the desired gear ratio position and the yoke handle 80 is then released to bring the parts into operative position for the selected speed. The operation is repeated for each new change of speed ratio.

Where a single phase motor is used in connection with the rotating field and armature member and an interposed variable speed mechanism, an automatic governor of conventional type self-adjusting to the set speed of the apparatus is provided, so that starting may take place and a uniform speed ratio be established without further attention. However, efficiency and economy of operation may in most instances be more satisfactorily obtained through the use of a split phase motor.

The invention herein set forth may be readily applied to a split phase motor in the manner shown in Figures 5 to 7, inclusive. The motor as indicated may have the variable speed mechanism similar to that shown in Figure 1. If desired, such mechanism may be of the type shown in Figure 4, or other couplings of the moving field and armature members may be provided for. The casing and like parts in so far as they are identical with those shown in Figure 1 have been given similar reference characters.

The energizing field member 91 is mounted directly on the shaft 4 and carries the main coils and the split phase starting coils. The current is received through brushes 92, 93, bearing on the collector rings 94, 95, carried on the outer face of the insulated support 96 having terminals and starting switch control mechanism on its opposite face.

The armature member 97 is mounted concentrically of the energizing field member on ball bearings 98 carried by the shaft 4. For split phase starting, the automatic switch illustrated in Figures 6 and 7 is used, said switch being mounted on the collector ring support 96 and having a centrifugal control member 101 in the form of a weighted bar pivotally mounted upon a terminal pin 102 and carrying a spring contact member 103 engaging with a companion stationary plate contact 104 to connect through its terminal 105 the split phase windings of the armature through said switch members and the conductors 106, 107. The conductor 106 leads to the terminal 108 which is connected with the collector ring 94. The pin terminal 102 is connected with the other collector ring 95. A heat responsive releasing device is provided to break the circuit to the starting windings by means of the following mechanism. A latch bar 109 normally holds the weighted arm 101 from outward movement and maintains the starting circuit through the contacts on the members 103, 104. The latch bar 109 is pivoted adjacent the lower portion of the casing upon a terminal pin 111 and a coil spring 112 anchored outwardly on the member 96 and secured centrally to the latch bar tends to move the latch bar to releasing position. The latch bar is held in latching position by means of a length of wire 113 forming part of the starting circuit between the terminals 102 and 108 and adapted to be expanded through the heating effect of the current of the starting circuit. The wire is supported upon a series of rollers 114, 115, 116, of heat resisting material, so as to have adequate length to effect the movement required to release the latch bar. Upon the wire becoming heated and expanding, the latch bar will be drawn rearwardly by the spring 112 and its hooked upper end 117 released from engagement with the slide latch member 118 held in the forward position by means of a spring 119 and limited as to its degree of forward movement by means of a screw providing a limit stop 121. Thus, when the wire expands, the spring 112 will draw the latch bar 109 away from the nose of the sliding latch member 118 and the weighted arm 101 will be swung outwardly by centrifugal action, and the starting circuit of the motor will be broken. Such switch action will take place when the speed reaches a predetermined amount and thereafter the motor will operate at its stated rating. When the motor is stopped, a spring 122 anchored to the support 96 and connected to the weighted control member will restore the parts to the starting position with the latch member reengaged.

The main field coils are supplied through the terminals 123, 124, and the conductors 125, 126.

The split phase motor may have the positions of the rotating parts reversed as shown in Figure 8, wherein the rotating field member 127 is the outer member and the rotating armature 128 is the inner member. The collector rings 131, 132, are carried on the support 133 associated with the rotating field and the brushes 134, 135, carry the current through the casing to said collector rings. The switch and split phase control mechanism is mounted on the inner face of the support and is identical with the mechanism shown in Figures 6 and 7.

The apparatus in the various forms described, as well as in other embodiments thereof coming within the scope of the claims, presents distinct advantages over apparatus having independent transmission devices at the end of the shaft. The coupling member, it will be noted, is mechanically interposed between the rotating electrically energized elements and has a rolling contact, inasmuch as the electrical energy of each element is oppositely directed and the driving ring member is thus driven from each side, and, since these members move in opposite directions, the intermediate ring member rolls between them and this movement is assisted and not opposed by the electrical impulses. The positioning of the inner rotating member is slightly offset relation from the magnetic central plane, causes the electrical energy to supplement the spring in holding the plates in engagement with the driving ring member.

The invention thus includes the method of engaging an energized rotating field member with a rotating armature member in both electrical and mechanical interrelation, and in having these engagements cooperative and supplementary to each other. This includes the magnetic forces supplementing the engagement of the transmission plates on the driving ring member and the electrical forces producing opposite rolling contact with said driving ring on opposite sides.

Other modes of applying the principle of my invention may be employed instead of those explained, change being made as regards the structures herein disclosed, provided the means stated by any of the following claims or the equivalent of such stated means be employed.

I therefore particularly point out and distinctly claim as my invention:

1. A single phase induction motor having in combination, a revolving field member and a revolving armature member in concentric rotatable relation, main field coils and starting field coils on said field member, temperature responsive means for disconnecting said starting coils at a predetermined speed of said field member, and means for changing in complementary ratio the speeds of said members relative to their supports while maintaining their relative speed substantially constant.

2. A single phase induction motor having in combination, a revolving field member and a revolving armature member in concentric rotatable relation, main field coils and starting field coils on said field member, current controlled means for disconnecting said starting coils at a predetermined speed of said field member, and means for changing in complementary ratio the speeds of said members relative to their supports while maintaining their relative speed substantially constant.

3. A single phase induction motor having in combination, a revolving field member and a revolving armature member in concentric rotatable relation, main field coils and starting field coils on said field member, current controlled means in the starting coil circuit for disconnecting said starting coils at a predetermined speed of said field member, and means for changing in complementary ratio the speeds of said members relative to their support while maintaining their relative speed substantially constant.

4. A single phase induction motor having in combination, a revolving field member and a revolving armature member in concentric rotatable relation, main field coils and starting field coils on said field member, separate circuits for said field and starting coils, a centrifugal switch member for disconnecting said starting coil, a latch element for holding said centrifugal member out of action, and current actuated means for releasing said latch member.

5. A single phase induction motor having in combination, a revolving field member and a revolving armature member in concentric rotatable relation, main field coils and starting field coils on said field member, separate circuits for said field and starting coils, a centrifugal switch member for disconnecting said starting coil, a latch element for holding said centrifugal member out of action, current actuated means for releasing said latch member, and automatic means for restoring said latch member into its original position.

6. An apparatus of the character described having in combination, a shaft, a rotating field member and a rotating armature member mounted concentrically of said shaft and one of said members being secured thereto, said field and armature being offset from magnetic balance when idle, and drawn toward each other when energized, a friction disk secured to each of said members respectively, one of said friction disks having an enlarged hub, means for securing said hub to said shaft, resilient means interposed between said hub and said disk for moving said disk toward its companion disk, in addition to said magnetic means, and driving elements interposed between said respective disks for positively connecting said members for motion in opposite directions.

7. An apparatus of the character described having in combination, a shaft, a rotating field member and a rotating armature member mounted concentrically of said shaft and one of said members being secured thereto, said field and armature being offset from magnetic balance when idle, and drawn toward each other when energized, a friction disk secured to each of said members respectively, one of said friction disks having an enlarged hub, means for securing said hub to said shaft, resilient means interposed between said hub and said disk for moving said disk toward its companion disk, in addition to said magnetic means, driving elements interposed between said respective disks for positively connecting said members for motion in opposite directions, and means for shifting said driving elements to complementary angular positions.

8. An apparatus of the character described having in combination, a rotating field member and a rotating armature member, offset from magnetic balance when idle, and drawn toward each other when energized, means interengaged between said field and armature members to provide a ratio of motion in opposite directions between said members, said means comprising a spider mounted concentrically with said field and armature members and adapted to be held in substantially fixed relation thereto, said spider having movable arms carrying driving elements, driving disks associated with the rotating field member and rotating armature member, respectively, means for placing said driving disks in interengaged operative contact with said driving elements in addition to said magnetic means, and unitary means for shifting and locking said movable arms in complementary angular positions.

9. An alternating current induction motor having in combination, a shaft, a wound rotating member mounted on said shaft, an induction member concentric with said wound rotating member and rotatably supported on said shaft, said rotating members being offset from magnetic balance when idle, and drawn toward each other when energized, current conducting means for supplying current to said wound rotating member, a pulley mounted on said shaft, a pair of friction disks associated respectively with the wound member and the induction member, a spider positioned loosely on said shaft intermediate said disks, friction driving elements carried by said spider, and means for simultaneously moving said driving elements angularly in complementary positions and holding the same in adjustment.

10. An alternating current induction motor having in combination, a shaft, a wound rotating member mounted on said shaft, an induction member concentric with said wound rotating member and rotatably supported on said shaft, said rotating members being offset from magnetic balance when idle, and drawn toward each other when energized, current conducting means for supplying current to said wound rotating member, a pulley mounted on said shaft, a pair of friction disks associated respectively with the wound member and the induction member, a spider positioned loosely on said shaft intermediate said disks, friction driving elements carried by said spider, means for simultaneously moving said driving elements angularly in complementary positions and holding the same in adjustment, and a hub associated with one of said friction disks, said hub carrying resilient means for holding said friction disks in operative relation to said driving elements.

11. An apparatus of the character described having in combination a shaft, a rotatable field member and a rotatable armature member mounted offset concentrically on said shaft, driving members associated with each of said members, driving elements interposed between said driving members, and driven by each of them by rolling action when said rotating members are electrically nergized and held in engagement with said driving members by the magnetic effect of said energized rotating members.

WILLIAM P. HUNSDORF.